United States Patent
Jang et al.

(10) Patent No.: US 9,525,601 B2
(45) Date of Patent: Dec. 20, 2016

(54) METHOD AND APPARATUS FOR MANAGING CONNECTION USING DUMMY HTTP

(71) Applicant: TMAXSOFT. CO., LTD., Seongnam-si (KR)

(72) Inventors: YoungHwi Jang, Seongnam-si (KR); HuiSung Lee, Seongnam-si (KR); Moon Namkoong, Seongnam-si (KR); EuiGeun Chung, Seongnam-si (KR)

(73) Assignee: TMAXSOFT.CO., LTD., Gyeonggi-Do (KR)

(*) Notice: Subject to any disclaimer, the term of this patent is extended or adjusted under 35 U.S.C. 154(b) by 118 days.

(21) Appl. No.: 14/252,057

(22) Filed: Apr. 14, 2014

(65) Prior Publication Data
US 2015/0244774 A1 Aug. 27, 2015

(30) Foreign Application Priority Data
Feb. 27, 2014 (KR) .................. 10-2014-0022962

(51) Int. Cl.
*H04L 29/08* (2006.01)
*H04L 12/24* (2006.01)

(52) U.S. Cl.
CPC .............. *H04L 41/50* (2013.01); *H04L 67/02* (2013.01); *H04L 67/14* (2013.01); *H04L 67/141* (2013.01);
(Continued)

(58) Field of Classification Search
CPC .......... H04L 67/02; H04L 67/06; H04L 69/16; H04L 67/26; H04L 67/34; H04L 67/1002; H04L 67/2842; H04L 29/06; H04L 47/10; H04L 67/2814; H04L 47/263; H04L 67/142; H04L 69/329; H04L 67/14; H04L 67/303; H04L 63/08; H04L 67/141; H04L 67/28; H04L 63/0227; H04L 63/10; G06Q 30/02; G06Q 10/10; G06Q 10/107; G06F 17/30581; G06F 2209/541; H04N 21/254; H04N 21/25816; H04N 21/6581; H04N 21/44222; G09G 2370/22
(Continued)

(56) References Cited

U.S. PATENT DOCUMENTS 6,105,067 A * 8/2000 Batra .................. H04L 12/5692
709/203
2006/0095572 A1* 5/2006 Burke .................... H04L 67/14
709/227
(Continued)

FOREIGN PATENT DOCUMENTS

KR 10-2012-0065674 6/2012

OTHER PUBLICATIONS

Office Action dated Dec. 17, 2014 for Korean Patent Application No. 10-2014-0022962.

*Primary Examiner* — Patrice Winder
*Assistant Examiner* — Abderrahmen Chouat
(74) *Attorney, Agent, or Firm* — Ladas & Parry, LLP

(57) ABSTRACT

A method for managing connections using a dummy HTTP, the method comprising: upon receiving an HTTP request from a client, establishing, by a Web server, a connection to a Web application server to transmit the HTTP request to the Web application server over the connection; transmitting, by the Web server, an HTTP response received from the Web application server to the client; and continuing, by the Web server, the connection by exchanging a dummy HTTP request and a dummy HTTP response with the Web application server when a count of a duration time of the connection reaches a preset survival check time.

8 Claims, 6 Drawing Sheets

(52) U.S. Cl.
CPC ........... *H04L 67/145* (2013.01); *H04L 67/148* (2013.01); *H04L 67/28* (2013.01); *G06F 2209/5011* (2013.01)

(58) Field of Classification Search
USPC ....... 709/203, 219, 224, 217, 223, 227, 232; 707/707, 802
See application file for complete search history.

(56) References Cited

U.S. PATENT DOCUMENTS

| | | | |
|---|---|---|---|
| 2010/0281118 A1* | 11/2010 | Donahue | H04L 67/145 709/206 |
| 2011/0137973 A1* | 6/2011 | Wei | H04L 67/1008 709/202 |
| 2013/0007484 A1* | 1/2013 | Gobriel | G06F 1/3209 713/320 |
| 2013/0191525 A1 | 7/2013 | Kang | |
| 2015/0088934 A1* | 3/2015 | Beckman | G06F 21/6227 707/781 |

* cited by examiner

METHOD AND APPARATUS FOR MANAGING CONNECTION USING DUMMY HTTP

CROSS-REFERENCE TO RELATED APPLICATIONS

This application is based on and claims priority from Korean Patent Application No. 10-2014-0022962, filed on Feb. 27, 2014, the disclosure of which is incorporated herein in its entirety by reference.

FIELD OF THE INVENTION

The present invention relates to a method for managing connections between communication devices, and more particular, to a method and apparatus for managing HTTP connections using a dummy HTTP that is adapted to continue and re-use the HTTP connection that has been established in communicating between a web server and a web application server.

BACKGROUND OF THE INVENTION

As is well known, a Web server, in response to an HTTP request from a client, establishes an HTTP connection (or HTTPS connection) to a Web application server and sends the HTTP request to the Web application server. The Web server receives an HTTP response from the Web application server in response to the HTTP request and forwards it to the client.

In general, the Web server makes a socket connection (or HTTP connection) to the Web application server, and in some cases, if the Web application server requests to use SSL encrypted communication, the Web server needs to make an SSL connection (or an HTTPS connection) to the Web application server.

Thereafter, the Web server may close the HTTP connection with the Web application server. If the Web server does not immediately close the HTTP connection, the Web applications server may shutdown the HTTP connection after a Keep-alive time has passed.

In other words, the Web server repeats a procedure that creates and closes an HTTP connection to the Web application server every time it receives an HTTP request from the client and creates and closes the HTTP connection again when a new HTTP request comes in from the client.

However, the frequent creation and closing of the HTTP connection every HTTP request from the client may result in an overhead on the Internet environment that requires high-speed response. Especially, the overhead may further increase in a case where the Web server makes an HTTP connection to the Web application server but needs an SSL connection (HTTPS connection) for the SSL encrypted communication.

SUMMARY OF THE INVENTION

In view of the above, the present invention provides a method and apparatus for managing HTTP connections established between a Web server (or a reverse proxy server) and a Web application server in response to a request from a client that is capable of continuing and re-using the HTTP connections in a way of exchanging dummy HTTP request and response between the Web server and the Web application server in preset time intervals.

The technical subject of the present invention are not limited to the foregoing technical subject, and other technical subjects that are not mentioned above may be clearly understood to those skilled in the art from the description as stated below.

In accordance with an embodiment of the present invention, there is provided a method for managing connections using a dummy HTTP, which includes: upon receiving an HTTP request from a client, establishing, by a Web server, a connection to a Web application server to transmit the HTTP request to the Web application server over the connection; transmitting, by the Web server, an HTTP response received from the Web application server to the client; and continuing, by the Web server, the connection by exchanging a dummy HTTP request and a dummy HTTP response with the Web application server when a count of a duration time of the connection reaches a preset survival check time.

In the embodiment, the method further comprising: initializing the count of the duration time of the connection when the dummy HTTP response is received.

In the embodiment, the preset survival check time is set shorter than a keep-alive time of the Web application server.

In the embodiment, the keep-alive time is obtained from the header of the HTTP response.

In the embodiment, the keep-alive time is obtained in a way of checking a time point at which an HTTP connection created early between the Web server and the Web application server is shut down depending on the keep-alive time.

In the embodiment, the dummy HTTP request is configured to employ a HEAD method so that only the HTTP header of an HTTP request method can be received in the response.

In the embodiment, the Web server comprises a reverse proxy server having a proxy function.

In accordance with another embodiment of the present invention, there is provided an apparatus for managing connections using dummy HTTP, which includes: a connection request handler, upon receiving an HTTP request from a client, configured to establish a connection to a Web application server to transmit the HTTP request to the Web application server over the connection; a connection reply handler configured to transmit an HTTP response transferred from the Web application server to the client; a connection time monitor configured to count a duration time of the connection to the Web application server, a continuous connection controller configured to continue the connection by exchanging a dummy HTTP request and a dummy HTTP response with the Web application server when a count of a duration time of the connection reaches a preset survival check time; and a duration time manager configured to initialize the count of the duration time of the connection when the dummy HTTP response is received.

In the embodiment, the preset survival check time is set shorter than a keep-alive time of the Web application server.

In the embodiment, the apparatus further comprising: a check time acquirer configured to obtain the keep-alive time from a header of the HTTP response, the obtained keep-alive time being provided to the continuous connection controller.

In the embodiment, the apparatus further comprising: a check time acquirer configured to obtain the keep-alive time in a way of checking a time point at which an HTTP connection created early between the Web server and the Web application server is shut down depending on the keep-alive time, the obtained keep-alive time being provided to the continuous connection controller.

In the embodiment, the continuous connection controller is configured to create the dummy HTTP request which employs a HEAD method that receives only an HTTP header of an HTTP request method in the response.

In accordance with another embodiment of the present invention, there is provided a method for managing connections using dummy HTTP, the method comprising: setting up a connection pool of a plurality of HTTP connections that are created based on HTTP requests and HTTP responses exchanged between a Web server and a Web application server, upon receiving an HTTP request from a client, searching the connection pool to check whether any reusable HTTP connection is present; when any reusable HTTP connection is present, processing the HTTP request by utilizing the reusable HTTP connection and returning the reusable HTTP connection to the connection pool; when any reusable HTTP connection is absent, checking whether the number of the plurality of HTTP connections is less than or equal to that of preset reference connections; when the number of the plurality of HTTP connections is less than that of preset reference connections, creating a new HTTP connection, processing the HTTP request, and returning the new HTTP connection to the connection pool; monitoring a duration time of the respective HTTP connections in the connection pool during performing any one of the aforementioned operations; and when any persistent HTTP connection to keep on that reaches a preset survival check time is detected, continuing the persistent connection by exchanging a dummy HTTP request and a dummy HTTP response with the Web application server.

In the embodiment, the number of preset reference connections is variably adjusted in a range between a preset maximum number and a preset minimum number based on an analyzed result of concurrence frequency of HTTP requests transmitted from the respective clients.

In the embodiment, the number of preset reference connections is variably adjusted in a range between a preset maximum number and a preset minimum number based on the load state of connections requests on the Web application server.

In the embodiment, the method further comprising: when the number of the plurality of HTTP connections is equal to that of the number of preset reference connections, queuing the HTTP request; and when any HTTP connection among from the plurality of HTTP connections is returned to be reusable, processing the HTTP connection by utilizing the returned HTTP connection.

In the embodiment, the method further comprising: when the dummy HTTP response is received, initializing a duration time of the persistent HTTP connection under monitoring.

In accordance with another embodiment of the present invention, there is provided an apparatus for managing connections using dummy HTTP, which includes: a connection pool generator configured to set up a connection pool of HTTP connections that are newly created based on HTTP requests from clients; a connection manager, upon receiving an HTTP request from a client, configured to search the connection pool to check whether any reusable HTTP connection is present; a connection request handler, when any reusable HTTP connection is present, configured to process the HTTP request by utilizing the reusable HTTP connection; a connection request supporter, when any reusable HTTP connection is absent, configured to check whether the number of the HTTP connections is less than or equal to that of a preset reference connections, and when the number of the plurality of HTTP connections is less than that of the preset reference connections, to create a new HTTP connection to instruct the connection request handler to process the HTTP request; a connection time manager configured to count a duration time of the respective HTTP connections in the connection pool and to designate any connection of which the count value of the duration time reaches a preset survival check time as a persistent HTTP connection to keep on; and a continuous connection controller, when the persistent HTTP connection is designated, configured to continue the persistent HTTP connection by exchanging a dummy HTTP request and a dummy HTTP response with the Web application server.

In the embodiment, the apparatus further comprising: a connection number adaptive manager configured to adjust the number of the preset reference connections in a variable manner in a range between a preset maximum number and a preset minimum number based on an analyzed result of concurrence frequency of HTTP requests transmitted from the respective clients.

In the embodiment, the apparatus further comprising: a connection number adaptive manager configured to adjust the number of preset reference connections in a variable manner in a range between a preset maximum number and a preset minimum number based on the load state of connections requests on the Web application server.

The embodiment of the present invention enables HTTP connections established between a Web server and a Web application server to be kept and re-used by allowing the web server to exchange dummy HTTP request and response to the Web application server in preset time intervals. Therefore, the following effects may be expected.

First, it is possible to reduce the overhead caused by the procedure that creates and closes an HTTP connection between the Web server and the Web application server every time the Web server receives a request from the client.

Second, the re-use of the HTTP connection may guarantee a higher speed to the client.

Third, it is possible to enable efficient management of the resources and mitigate the load in the Web application server to adjust the load in a way of setting up a connection pool of HTTP connections and adjusting the HTTP connections and requests.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Hereinafter, the embodiments of the present invention will be described in detail with reference to the accompanying drawings.

Figure 1:
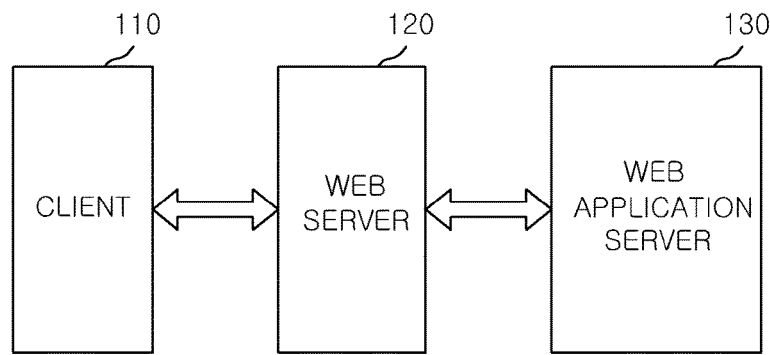
FIG. 1 shows a configuration diagram of a network system adapted for implementing a technology of managing HTTP connections using a dummy HTTP in accordance with an exemplary embodiment of the present invention.

FIG. 1 shows a configuration diagram of a network system adapted for applying the technology of managing HTTP connections using a dummy HTTP in accordance with an exemplary embodiment of the present invention. The network system includes a client 110, a Web server 120, and a Web application server 130.

Referring to FIG. 1, the client 110 may refer to a portable terminal, for example, handheld telephones, smartphones, PMPs, smart pads, smartbooks, tablet PCs, netbooks, notebooks, and the like or a wire communication terminal (for example, desktop PCs, notebook PCs, tablet PCs, netbooks, etc.) having a network communication interface that is capable of connecting to the Web server 120 through a network, e.g., the Internet. Although only one client has been illustrated in this drawing for the convenience of explanation and promotion of understanding, it is possible for the embodiment to have a configuration in which the unspecified number of clients is substantially connected to the Web server 120 via the network.

The Web server 120 may be, for example, a proxy server or a reverse proxy server that serves to provide a proxy function to the clients. The Web server 120 is responsible for providing a connection management service using a dummy HTTP in communication with the Web application server 130 (for example, by exchanging HTTP request and response between them). As an example, the Web server 120 may have the configuration as illustrated in FIG. 2.

Figure 2:
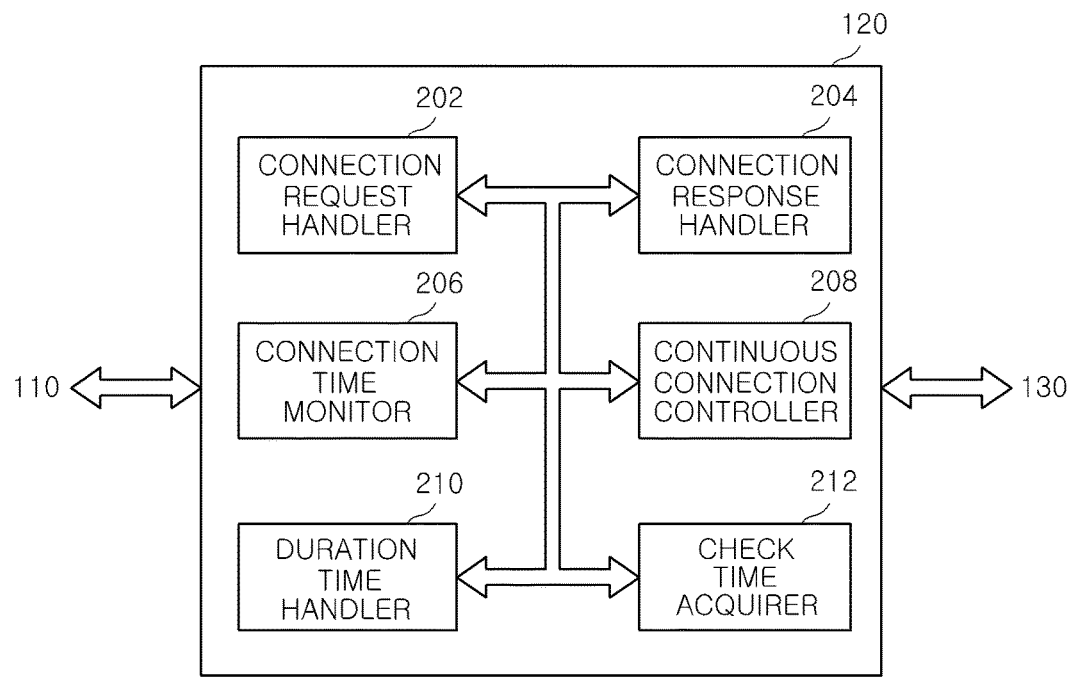
FIG. 2 is a block diagram of an apparatus for managing HTTP connections using a dummy HTTP in accordance with an exemplary embodiment of the present invention.

FIG. 2 is a block diagram of an apparatus for managing HTTP connections using a dummy HTTP in accordance with an exemplary embodiment of the present invention. The apparatus includes a connection request handler 202, a connection response handler 204, a connection time monitor 206, a continuous connection controller 208, a duration time manager 210, and a check time acquirer 212.

Referring to FIG. 2, upon receiving an HTTP request (or HTTPS request) from the client of FIG. 1 through the network such as a wired network or wireless network, the connection request handler 202 make an HTTP connection (or HTTPS connection) to the Web application server 130 (a creation of HTTP connection) and transmits the HTTP request to the Web application server 130 over the created HTTP connection. In addition, after the creation of HTTP connection, the connection request handler 202 notices the connection time monitor 206 of the creation of HTTP connection.

Meanwhile, when receiving the HTTP connection from the Web server (for example, a proxy server or a reverse proxy server) over the HTTP connection, the Web application server 130 produce an HTTP response (or HTTPS response) corresponding to the received HTTP request and then transmits (transfers) it to the Web server 120 through the network.

The connection response handler 204 receives the HTTP response from the Web application server 130 as a reply to the HTTP request transmitted from the Web server 120 and forwards the received HTTP response to the client 110.

The connection time monitor 206 counts the duration time of the connection between the Web server 120 and the Web application server 130 when being informed of the creation of the HTTP connection from the connection request handler 202, and sends the count value (i.e., the count value of the duration time of the connection) to the continuous connection controller 208.

Once receiving the count value of the duration time of the connection provided from the connection time monitor 206, the continuous connection controller 208 compares the count value with a preset survival check time. As a result of the comparison, if the duration time of the connection reaches the preset survival check time, the continuous connection controller 208 creates a dummy HTTP request (or a dummy HTTPS request) and transmit it to the Web application server 130 (so as to call the Web application server). Further, the continuous connection controller 208, upon receiving a dummy HTTP response (or a dummy HTTPS response) from the Web application server 130 as a reply to the HTTP request, manages to continue the HTTP connection that has already been established (an active maintenance of the HTTP connection that has already been established). In accordance with an exemplary embodiment, the preset survival check time may be automatically set based on a keep-alive time provided by the check time acquirer 212, which may be set shorter than a keep-alive time for the Web server 120 set in the Web application server 130. Of course, in a specific system environment where both the Web server and the Web application server are operated by the same system administrator, the survival check time may be manually set by the operator.

The dummy HTTP request, which is transmitted to the Web application server 130 in order for continuing an existing HTTP connection that has already established, is configured to employ a HEAD method so that only the HTTP header of an HTTP request method can be received in the response, which is for minimizing the response. The minimization of the response used herein means to minimize the size of dummy traffic in a way of not returning an HTTP body in the Web application server in the response to the dummy HTTP request.

Further, the continuous connection controller 208 notifies the dummy HTTP response received from the Web application server 130 to the duration time manager 210.

The duration time manager 210, when being informed of the receipt of the dummy HTTP response from the continuous connection controller 208, initializes the count value of a relevant HTTP connection, i.e., the count value of duration time of the HTTP connection, and instructs the connection time monitor 206 to resume counting the HTTP connection in order for managing to continue the HTTP connection.

The check time acquirer 212 gets the keep-alive time and forwards it to the continuous connection controller 208. The keep-alive time may be obtained from the header of the HTTP response or by checking a point of time where the HTTP connection created early between the Web server 120 and the Web application server 130 is shut down depending on the keep-alive time.

Hereinafter, a description will be made on a method for continuing HTTP connections using the dummy HTTP in the apparatus of the present embodiment having the aforementioned configuration.

Figure 3:
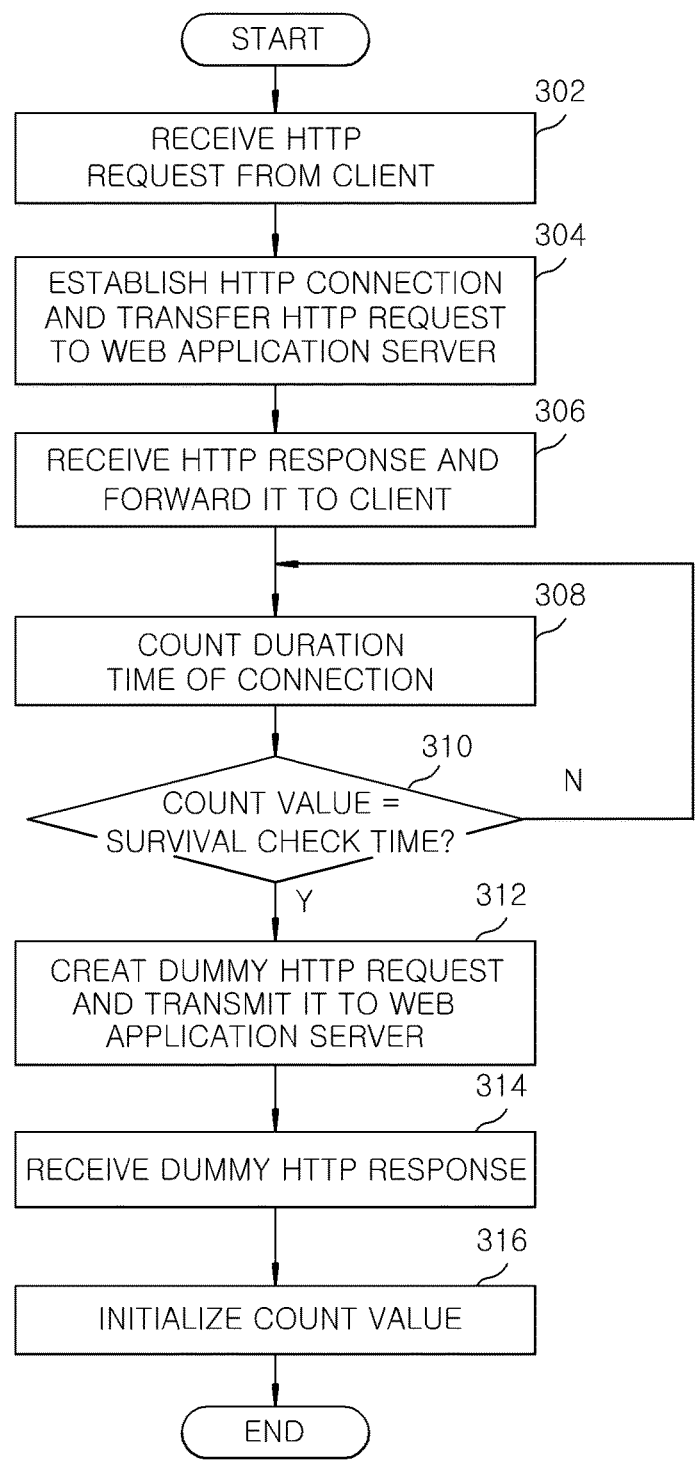
FIG. 3 depicts a flow chart illustrating main procedures of managing HTTP connections using a dummy HTTP in accordance with an exemplary embodiment of the present invention.

FIG. 3 depicts a flow chart illustrating main procedures of managing HTTP connections using a dummy HTTP in accordance with an exemplary embodiment of the present invention.

Referring to FIG. 3, when an HTTP request (HTTPS request) is received from the client 110 (Block 302), the connection request handler 202 establishes an HTTP connection (HTTPS connection) to the Web application server 130 (the creation of HTTP connection) and transmits the HTTP request (or HTTPS request) to the Web application server 130 over the established HTTP connection (Block 304).

Accordingly, the Web application server 130 produces an HTTP response (or HTTPS response) corresponding to the transmitted HTTP request and transmits it to the Web server 120 via the network and the connection reply handler 204, in response thereto, transmits the received HTTP response to the client 110 (Block 306).

Next, the connection time monitor 206 initiates to count the connection duration time of the HTTP connection between the Web server 120 and the Web application server 130 in accordance with the notice of the creation of the HTTP connection provided from the connection request handler 202 (Block 308). The count value of the duration time of connection is then transferred to the continuous connection controller 208.

Thereafter, the continuous connection controller 208 compares the count value of the duration time of connection to a preset survival check time to determine whether the count value of the duration time of connection reaches the preset survival check time (Block 310). If the count value of the duration time of connection is determined to reach the preset survival check time, the continuous connection controller 208 produces a dummy HTTP request (or the dummy HTTPS request) to transmit the same to the Web application server 130 (Block 312). In this case, for example, the dummy HTTP request is configured to employ a HEAD method so that only the HTTP header of an HTTP request method can be received in the response.

Upon receiving the dummy HTTP response corresponding to the dummy HTTP request from the Web application server 130 (Block 314), the continuous connection controller 208 notifies the receipt of the dummy HTTP response to the duration time manager 210.

AS a result, the duration time manager 210 initializes the count value of the HTTP connection that has been counted by the connection time monitor 206, i.e., the count value of duration time of connection (Block 316), and instructs the connection time monitor 206 to resume counting the HTTP connection in order to continue the HTTP connection. The connection time monitor 206 then begins to count again the duration time of the HTTP connection.

On the other hand, in accordance with the embodiment of the present invention, it is possible to set up a connection pool of a plurality of HTTP connections and manage to keep on the HTTP connections, which will be discussed in detail with reference to FIG. 4 to FIG. 7.

Figure 4:
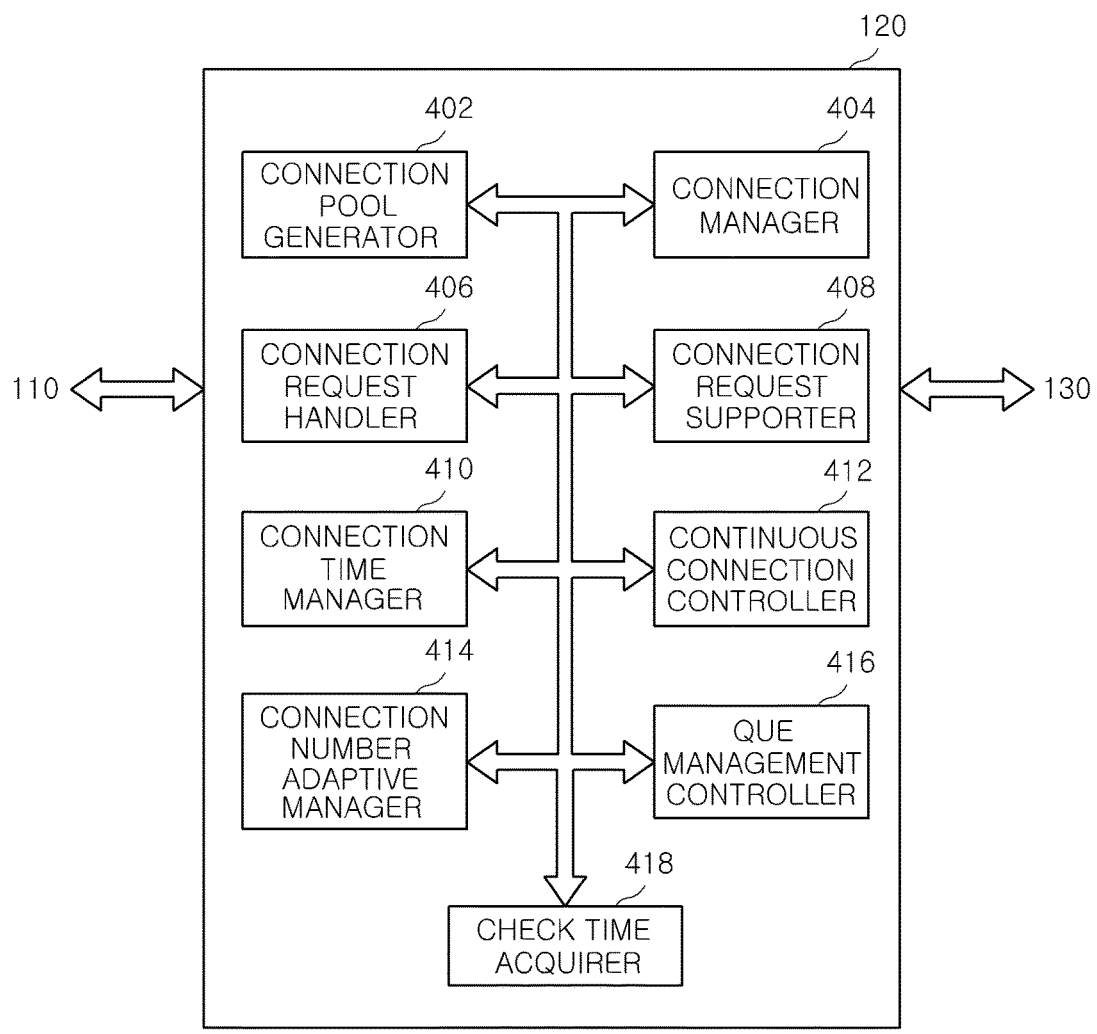
FIG. 4 shows a block diagram of an apparatus for managing HTTP connections using a dummy HTTP in accordance with an exemplary extended embodiment of the present invention.

FIG. 4 shows a block diagram of an apparatus of managing HTTP connections using a dummy HTTP in accordance with an exemplary extended embodiment of the present invention. The apparatus for managing HTTP connection includes a connection pool generator 402, a connection manager 404, a connection request handler 406, a connection request supporter 408, a connection time manager 410, a continuous connection controller 412, a connection number adaptive manager 414, a queue management controller 416, and a check time acquirer 418.

Referring to FIG. 4, the connection pool generator 402 sets up and manage the connection pool of HTTP connections that are newly established in accordance with requests from the clients.

In addition, when receiving an HTTP request (HTTPS request) from the client 110, the connection pool generator 402 searches the connection pool of a plurality of HTTP connections (or a plurality of HTTPS connections) to identify whether or not any reusable HTTP connection is present. If any reusable HTTP connection is identified to be present, the reusable HTTP connection is transferred to the connection request handler 406, whereas if the reusable HTTP connection is identified to be absent, the identification is notified to the connection request supporter 408. In this embodiment, the connection pool may be comprised of, e.g., several tens or several hundreds of HTTP connections.

The connection request handler 406 receives the presence of the reusable HTTP connection from the connection manager 404, processes the HTTP request by utilizing the reusable HTTP connection, and then returns the reusable HTTP connection after processing the HTTP request. The processing of the HTTP request used herein refers to a series of procedures of exchanging (communicating) the HTTP request and HTTP response with the Web application server 130, transmitting the HTTP response received from the Web application server 130 to the client 110, and the like.

The connection request supporter 408 serves to receive the notice that the reusable HTTP connection is absent from the connection manager 404 and to check whether the number of the plurality of HTTP connections within the HTTP pool is less than or equal to the number of preset reference connections. If the number of HTTP connections is determined to be less than the number of preset reference connections from the check result, then the connection request supporter 408 creates a new HTTP connection, transfers the creation of the new HTTP connection to the connection request handler 406, and instructs the connection request handler 406 to process the HTTP request by way of the new HTTP connection.

Further, if the number of HTTP connections is determined to be equal to the number of preset reference connections, i.e., if all the HTTP connections managed in the connection pool are occupied, then the connection request supporter 408 notifies this situation to the check time acquirer 418.

Meanwhile, the connection time manager 410 monitors a duration time of connection (a duration time of connection between the Web server 120 and the Web application server 130) of the respective connections within the connection pool (counting the duration time of connection). When the count value of the duration time of connection reaches a preset survival check time, the connection time manager 410 designate the relevant HTTP connection as a persistent HTTP connection to be kept on and notifies it to the continuous connection controller 412.

Similar to the embodiment of FIG. 2, the preset survival check time may be automatically set based on a keep-alive time provided by the check time acquirer 418, which may be set shorter than the keep-alive time for the Web server 120 set in the Web application server 130.

Further, the connection time manager 410, when being informed of the response to the dummy HTTP response from the continuous connection controller 412, initializes the monitored count value of the duration time of the persistent HTTP connection and resumes counting the duration time of the persistent HTTP connection.

The continuous connection controller 412, when being informed of the presence of the persistent HTTP connection, manages to continue the persistent HTTP connection (to perform an active maintenance of the existing HTTP connection that has been established earlier) by exchanging the dummy HTTP request and the dummy HTTP response with the Web application server 130. The dummy HTTP request may be configured to employ a HEAD method so that only the HTTP header of an HTTP request method can be received in the response.

Further, when receiving the dummy HTTP response corresponding to the dummy HTTP request from the Web application server 130, the continuous connection controller 412 informs the dummy HTTP response to the connection time manager 410.

The connection number adaptive manager 414 variably adjusts the number of preset reference connections in a range between a preset maximum number of connections (e.g., 200 connections, 300 connections, etc.) and a preset minimum number of connections (e.g., 10 connections, 20 connections, etc.) based on the analyzed result of occurrence frequency of HTTP requests generated from the clients, or variably adjusts the number of preset reference connections in a range between a preset maximum number of connections and a preset minimum number of connections based on the load condition of connection requests on the Web application server 130.

In other words, the connection number adaptive manager 414 adaptively increases or reduces the number of reference connections (performs the dynamic maintenance of the number of reference connections) based on network environments or the load on the Web application server 130 or the like. Information on the increased or reduced number of reference connections is forwarded to the connection request supporter 408 to support the connection requests. For example, the connection number adaptive manager 414 may adaptively adjust the number of reference connections such that the number of reference connections is increased at a time zone or duration during which the amount of traffic is relatively large, whereas the number of reference connections is reduced at a time zone or duration during which an amount of traffic is relatively small.

When being informed from the connection request supporter 408 that the number of the HTTP connections managed in the connection pool are the same as that of preset reference connections, that is, all the HTTP connections managed in the connection pool are occupied, the queue management controller 416 queues an HTTP request from the client 110 and then monitors the connection pool. When it is monitored that any HTTP connection is returned to the connection pool, the queue management controller 416 informs the returned HTTP connection to the connection request handler 406 and instructs it to process the HTTP request in a queue through the use of the returned HTTP connection.

Further, the check time acquirer 418 gets the keep-alive time and transfers the same to the connection time manager 410. The keep-alive time may be obtained from the header of the HTTP response or by checking a point of time where the HTTP connection formed earlier between the Web server 120 and the Web application server 130 is closed depending on the keep-alive time.

Next, a description will be made on a method for continuing HTTP connections using dummy HTTP in the apparatus of the present extended embodiment having the aforementioned configuration.

Figure 5:
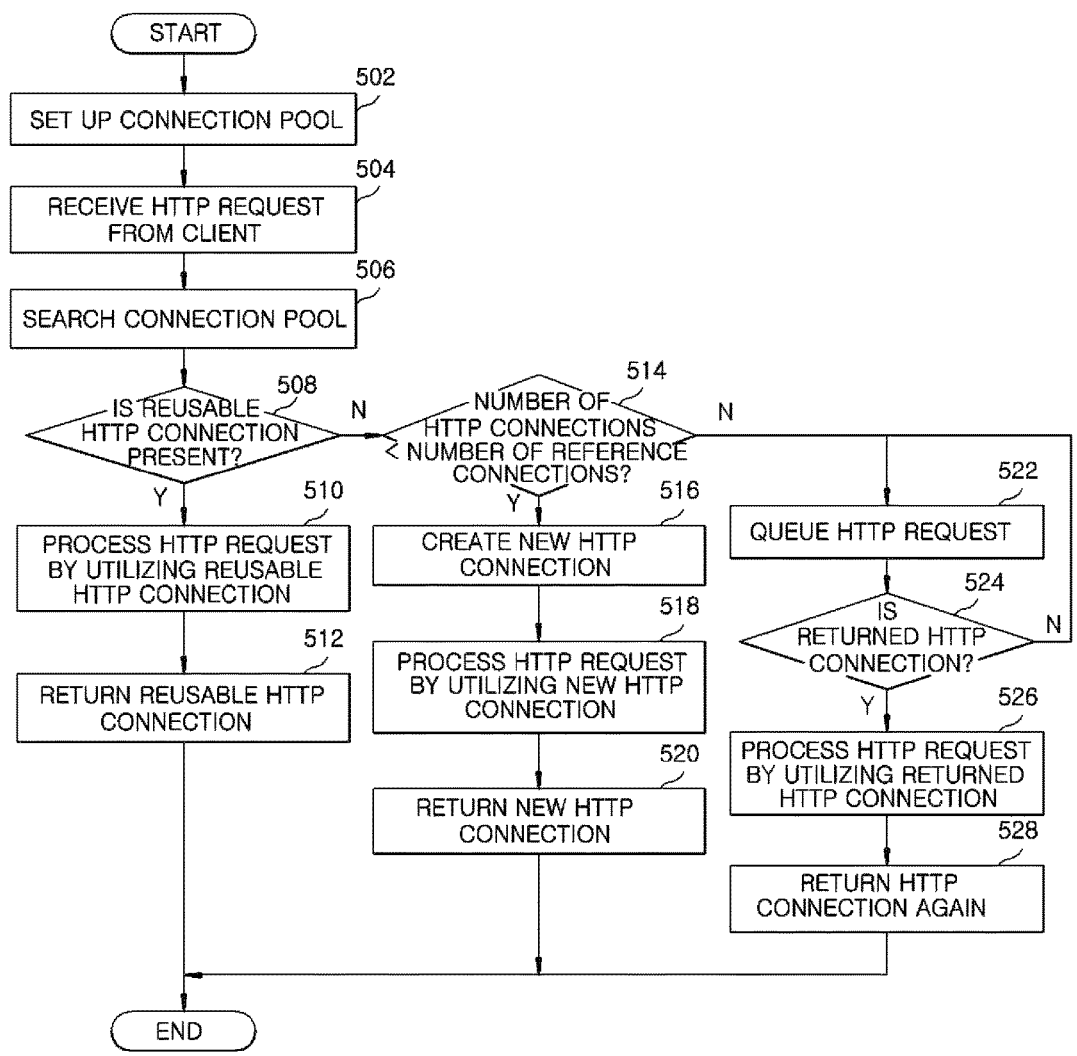
FIG. 5 depicts a flow chart illustrating main procedures of managing HTTP connections using a dummy HTTP in accordance with an exemplary extended embodiment of the present invention.

FIG. 5 depicts a flow chart illustrating main procedures of managing HTTP connections using dummy HTTP in accordance with an exemplary extended embodiment of the present invention.

Referring to FIG. 5, the connection pool generator 402 sets up and manages a connection pool of HTTP connections that are newly established in accordance with the requests from the clients (Block 502). Herein, the HTTP connections managed in the connection pool may be managed in a range of the number of reference connections, which will be discussed in detail with reference to FIG. 7.

As such, once the connection pool including a plurality of HTTP connections is set up, when an HTTP request is received from the client 110 (Block 504), the connection manager 404 searches for the connection pool of the plurality of HTTP connections (or HTTPS connections) (Block 506) and then determines whether any reusable HTTP connection is present in the connection pool (Block 508).

As a result of the determination in Block 508, if any reusable HTTP connection is present in the connection pool, then the connection request handler 406 processes the HTTP request by utilizing the reusable HTTP connection (Block 510) and returns the relevant HTTP connection to the connection pool (Block 512).

If, however, any reusable HTTP connection is absent in the connection pool from the determination result in Block 508, the connection request supporter 408 checks whether the number of HTTP connections in the connection pool is less than or equal to the number of preset reference connections (Block 514).

If the number of HTTP connections in the connection pool is determined to be less than the number of preset reference connections from the check result in Block 514, then the connection request supporter 408 creates an HTTP connection newly and transfer the creation of the new HTTP connection to the connection request handler 406 (Block 516).

Subsequently, the connection request handler 406 processes the HTTP request by utilizing the new HTTP connection (Block 518) and returns the new HTTP connection to the connection pool (Block 520).

However, if the number of HTTP connections in the connection pool is equal to the number of preset reference connections, i.e., all the HTTP connections are occupied, from the check result in Block 514, then the queue management controller 416 queues the HTTP request received from the client 110 (Block 522) and monitors whether any HTTP connection is returned to the connection pool (Block 524).

As a result of the monitoring in Block 524, if any HTTP connection is detected to be returned to the connection pool, this is notified to the connection request handler 406. Accordingly, the connection request handler 406 processes the HTTP request in the queue by making use of the returned HTTP connection (Block 526) and returns the HTTP connection utilized to process the HTTP request to the connection pool again (Block 528).

Figure 6:
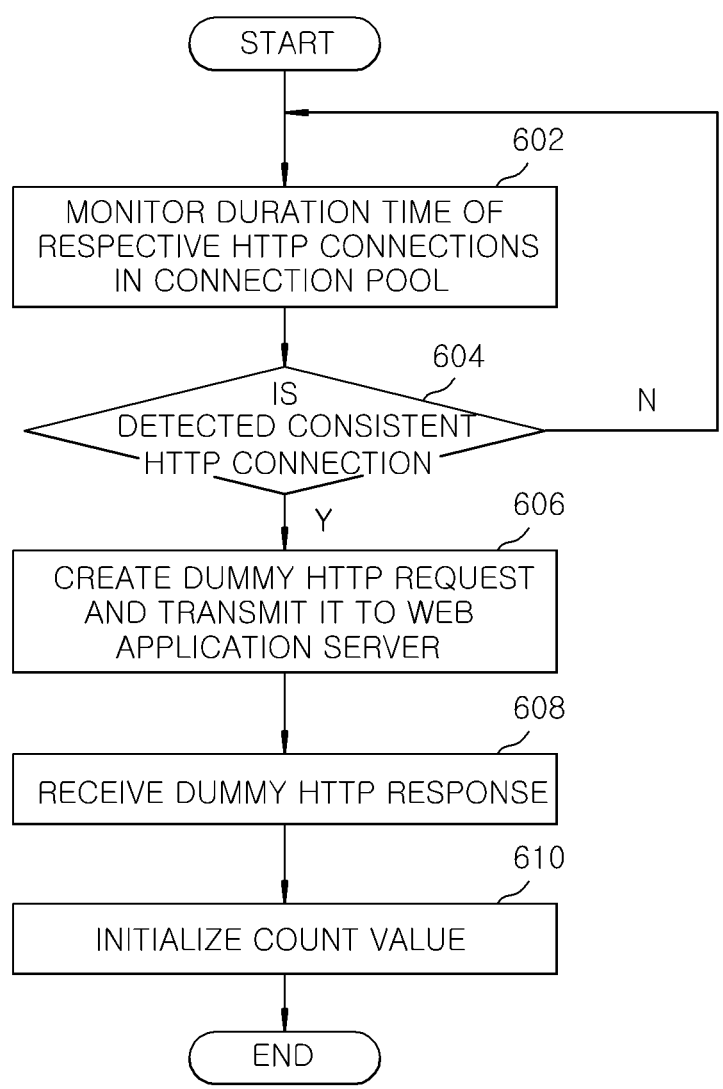
FIG. 6 depicts a flow chart illustrating main procedures of continuing existing HTTP connections using a dummy HTTP in accordance with an exemplary extended embodiment of the present invention.

FIG. 6 depicts a flow chart illustrating main procedures of an existing HTTP connection using dummy HTTP in accordance with an exemplary embodiment of the present invention.

Referring to FIG. 6, the connection time manager 410 monitors the duration time (or counts the duration time) of the respective HTTP connections in the connection pool (Block 602) and checks whether there is any HTTP connection of which the count value of the duration time of connection reaches a preset survival check time, that is, whether any persistent HTTP connection to keep on is present (Block 604).

AS a check result in Block 604, if it is detected that any persistent HTTP connection to keep on is present, the continuous connection controller 412 creates a dummy HTTP request and transmits it to the Web application server 130 via network (Block 606). Herein, the dummy HTTP request is configured to employ a HEAD method so that only the HTTP header of an HTTP request method can be received in the response.

Next, when receiving a dummy HTTP response corresponding to the dummy HTTP request from the Web application server 130 (Block 608), the continuous connection controller 412 informs the receipt of the dummy HTTP response to the connection time manager 410.

Accordingly, the connection time manager 410 initializes the count value of the HTTP connection, that is, the count value of the duration time thereof (Block 610) and resumes counting the HTTP connection in order for managing to continue the HTTP connection.

Figure 7:
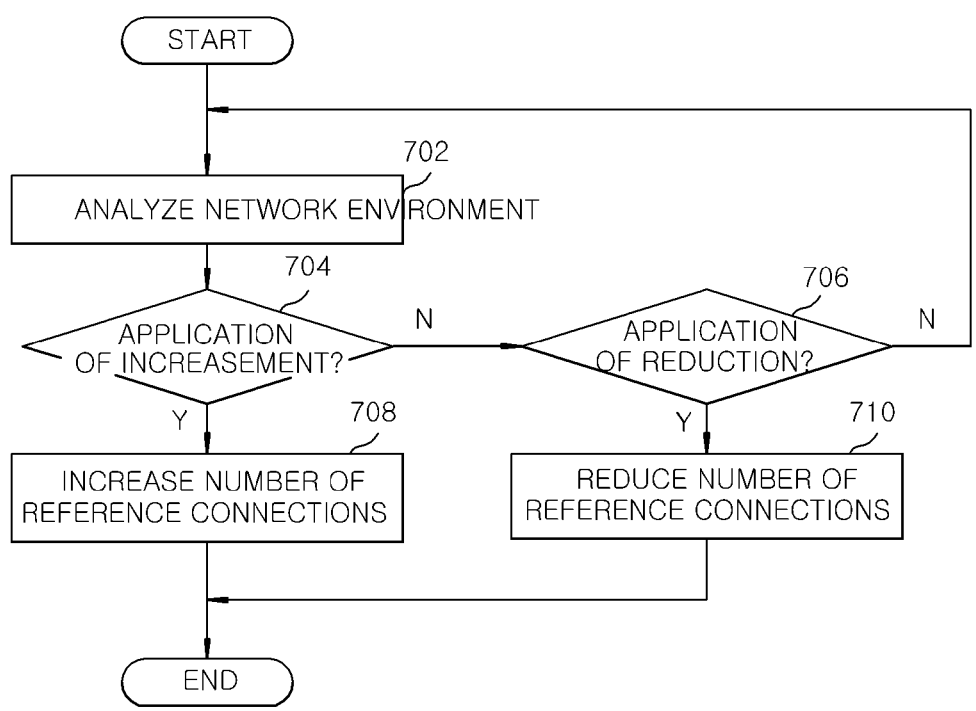
FIG. 7 depicts a flow chart illustrating main procedures of adjusting the number of reference connections in the connection pool based on the environment analysis of the network in accordance with an exemplary extended embodiment of the present invention.

FIG. 7 depicts a flow chart illustrating main procedures of adjusting the number of reference connections in the connection pool in a variable manner based on the environment analysis of the network in accordance with an exemplary extended embodiment of the present invention.

Referring to FIG. 7, once a connection pool is set up with a plurality of HTTP connections for the management, the connection number adaptive manager 414 performs an analysis of network environments (for example, the analysis of occurrence frequency of HTTP requests generated from the respective clients, the analysis of load state of connection requests on the Web application server, etc.) (Block 702).

Based on the analysis results in Block 702, it is checked whether the number of reference connections is increased (application of increment) (Block 704) or whether the number of reference connections is reduced (application of reduction) (Block 706). The number of reference connections may be variably adjusted in a range between a preset maximum number (e.g., about 200 connections, 300 connections, etc.) and a preset minimum number (e.g., about 10 connections, 20 connections, etc.).

If the number of reference connections is determined to be increased from the check result in Block 704, the connection number adaptive manager 414 increases the number of reference connections (Block 708) and notifies information on the increased number of reference connections to the connection request supporter 408. Accordingly, the connection request supporter 408 will determine whether to create a new HTTP connection based on the increased number of reference connections.

If, however, the number of reference connections is determined to be reduced from the check result in Block 704, the connection number adaptive manager 414 reduces the number of reference connections (Block 710) and notifies information on the reduced number of reference connections to the connection request supporter 408. Accordingly, the connection request supporter 408 will determine whether to create a new HTTP connection based on the reduced number of reference connections.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. Specifically, the exemplary embodiments disclosed herein are not used to limit the technical idea of the present invention, but to explain the present invention, and the scope of the technical idea of the present invention is not limited to these embodiments.

Therefore, the scope of protection of the present invention should be construed as defined in the following claims and changes, modifications and equivalents that fall within the technical idea of the present invention are intended to be embraced by the scope of the claims of the present invention.

What is claimed is:

1. A method for managing connections between a Web server and a Web application server connected with the Web server through a network by using dummy HTTP, the method comprising:
    setting up a connection pool of a plurality of HTTP connections that are created based on HTTP requests and HTTP responses exchanged between the Web server and the Web application server;
    upon receiving an HTTP request from a client, searching the connection pool to check whether any reusable HTTP connection is present;
    when any reusable HTTP connection is present, processing the HTTP request by utilizing the reusable HTTP connection and returning the reusable HTTP connection to the connection pool;
    when any reusable HTTP connection is absent, checking whether the number of the plurality of HTTP connections is less than or equal to the number of preset reference connections;
    variably adjusting the number of preset reference connections in a range between a preset maximum number and a preset minimum number based on the load state of connection requests, received from the web server through the network, on the Web application server;
    when the number of the plurality of HTTP connections is less than the number of preset reference connections, creating a new HTTP connection, processing the HTTP request, and returning the new HTTP connection to the connection pool;
    monitoring a duration time of the respective HTTP connections in the connection pool during performing any one of the aforementioned operations; and
    when any persistent HTTP connection to keep on that reaches a preset survival check time is detected, continuing the persistent connection by exchanging a dummy HTTP request and a dummy HTTP response with the Web application server.

2. The method of claim 1, wherein the number of preset reference connections is variably adjusted in a range between a preset maximum number and a preset minimum number based on an analyzed result of concurrence frequency of HTTP requests transmitted from the respective clients.

3. The method of claim 1, further comprising:
    when the number of the plurality of HTTP connections is equal to the number of preset reference connections, queuing the HTTP request; and
    when any HTTP connection among from the plurality of HTTP connections is returned to be reusable, processing the HTTP connection by utilizing the returned HTTP connection.

4. The method of claim 1, further comprising:
when the dummy HTTP response is received, initializing a duration time of the persistent HTTP connection under monitoring.

5. The method of claim 1, wherein the preset survival check time is set shorter than a keep-alive time of the Web application server.

6. The method of claim 5, wherein the keep-alive time is obtained from the header of the HTTP response.

7. The method of claim 5, wherein the keep-alive time is obtained in a way of checking a time point at which an HTTP connection created earlier between the Web server and the Web application server is shut down depending on the keep-alive time.

8. The method of claim 1, wherein the dummy HTTP request is configured by employing a HEAD method in which only the HTTP header of an HTTP request method is be received in the response.

* * * * *